United States Patent [19]

Taima et al.

[11] Patent Number: 5,199,777
[45] Date of Patent: Apr. 6, 1993

[54] DRAWER APPARATUS

[75] Inventors: Hajime Taima; Shinsuke Oki, both of Yokohama, Japan

[73] Assignee: Nifco Inc., Yokohama, Japan

[21] Appl. No.: 716,288

[22] Filed: Jun. 17, 1991

[30] Foreign Application Priority Data

Jun. 19, 1990 [JP] Japan .................................. 2-161073

[51] Int. Cl.[5] .............................................. A47B 88/00
[52] U.S. Cl. .................. 312/319.1; 312/9.22; 312/333
[58] Field of Search ............... 312/319, 333, 348, 9.22

[56] References Cited

U.S. PATENT DOCUMENTS

| | | | |
|---|---|---|---|
| 3,138,416 | 6/1964 | Abramovich | 312/348 |
| 4,191,292 | 3/1980 | Schweizer | 312/319 |
| 4,828,344 | 5/1989 | Omata | 312/319 |
| 5,004,306 | 4/1991 | Oshida | 312/319 |

*Primary Examiner*—Peter R. Brown
*Attorney, Agent, or Firm*—Kanesaka and Takeuchi

[57] ABSTRACT

A drawer apparatus includes a hollow housing, a tray slidably retained in the hollow housing, the tray being entered or drawn out from the housing through the open front surface thereof, and an urging device for urging the tray in a direction in which it protrudes from the open front surface of the housing. The urging device includes a constant-pressure spring, and a hook fixed to the other end portion of the constant-pressure spring, the hook being hooked to an open front edge portion of a bottom wall of the housing. A front frame is mounted on the housing. The front frame has a retaining portion which faces the open front edge portion of the bottom wall of the housing with the hook provided on the other end portion of the constant-pressure spring therebetween. A stopper member is provided on at least either an upper edge of a rear portion of the tray or an under surface of an upper wall of the housing which opposes the upper edge of the rear portion of the tray.

9 Claims, 6 Drawing Sheets

DRAWER APPARATUS

BACKGROUND OF THE INVENTION AND RELATED ART

The present invention relates to a drawer apparatus, and more particularly, to a drawer apparatus which is mounted on an instrument panel of a vehicle.

Conventionally, the drawer apparatus of the above-described type includes a hollow housing whose front surface is open, a tray slidably retained in this hollow housing, the tray being entered or drawn out from the open front surface of the housing, an urging means for urging the tray in the direction in which the tray protrudes from the open front surface of the housing, a locking means for locking the tray at a position where it is accommodated in the hollow housing, and a restricting means for restricting the maximum protruding position of the tray.

The urging means comprises a constant-pressure spring, and a spool to which one end portion of the constant-pressure spring is fixed, the constant-pressure spring being wound around the spool, the spool being pivotaly supported by the tray. The other end portion of the constant-pressure spring is fixed to the open front edge portion of the bottom wall of the housing. The tray is urged in the direction in which it protrudes from the open front surface of the housing by the contracting force with which the constant-pressure spring is wound around the spool (see Japanese Patent Laid-Open Nos. 199141/1988 and 21055/1990).

The other end portion of the constant-pressure spring is screwed to the open front edge portion of the bottom wall of the housing (Japanese Patent Laid-Open No. 199141/1988). Alternatively, a hook is provided on the other end portion of the constant-pressure spring, and this hook is hooked on the open front edge portion of the bottom wall of the housing (Japanese Patent Laid-open No. 21055/1990).

However, in the conventional drawer apparatus in which the other end portion of the constant-pressure spring is screwed, screwing is a troublesome and complicated work.

In the conventional drawer apparatus in which the hook provided on the other end portion of the constant-pressure spring is merely hooked on the open front edge portion of the bottom wall of the housing, the hook may be released.

Accordingly, an object of the present invention is to provide a drawer apparatus which ensures easy and reliable fixing of the other end portion of the constant-pressure spring.

Furthermore, in the conventional drawer apparatus, the receipts or thin cards placed in the tray may rise over the upper edge of the rear portion of the tray and accidentally fall into the housing where they cannot be reached. Furthermore, the receipts or cards which have fallen into the housing may cause the operational failure of the tray.

Accordingly, another object of the present invention is to provide a reliable drawer apparatus which is capable of preventing accidental fall of receipts or cards into the housing.

SUMMARY OF THE INVENTION

To achieve the above-described object, the present invention provides a drawer apparatus in which a front frame for framing the open front edge portion of a housing is provided in the housing. The front frame has an opening through which a tray is entered or drawn out from the housing. The front frame has a retaining portion which faces the open front edge portion of the bottom wall of the housing with a hook provided on the other end portion of a constant-pressure spring therebetween.

In the present invention, after the hook provided on the other end portion of the constant-pressure spring is hooked on the open front edge portion of the bottom wall of the housing, the front frame is mounted on the open front edge portion of the housing.

When the front frame is mounted, the retaining portion of the front frame is opposed to the open front edge portion of the bottom wall of the housing with the hook of the constant-pressure spring therebetween. Consequently, releasing of the hook from the open front edge portion of the bottom wall of the housing is prevented.

The present invention further provides a drawer apparatus in which a stopper member is provided on at least either the upper edge of the rear portion of the tray or the undersurface of the upper wall of the housing which faces the upper edge of the rear portion of the tray in such a manner that it protrudes toward and is located adjacent to the other of the upper edge of the rear portion of the tray or the undersurface of the upper wall of the housing.

In the present invention, the receipts or cards placed in the tray are prevented from falling into the housing over the upper edge of the rear portion of the tray by the presence of the stopper member.

DETAILED DESCRIPTION OF THE PREFERRED EMBODIMENT

A drawer apparatus 10 is used as, for example, a glove compartment provided within an vehicle chamber. The drawer apparatus 10 is fixedly provided within an instrument panel P of the vehicle.

As shown in the drawings, the drawer apparatus 10 includes a hollow housing 20 whose front surface is open, a tray 30 slidably retained in the hollow housing 20, the tray 30 being entered or drawn out from the housing 20 through the open front surface thereof, an urging means, which may be a constant-pressure spring 40, for urging the tray 30 in a direction in which it protrudes from the open front surface of the housing 20, a locking means, which may be a latch 50, for locking the tray 30 to the position where it is accommodated in the hollow housing 20 against the urging force of the constant-pressure spring 40, a restriction means, which may be guide grooves 60 within the housing 20, for restricting the maximum protruding position of the tray 30, and a braking means, which may be a rotary damper 70, for damping the urging force of the constant-pressure spring 40.

Figure 1:
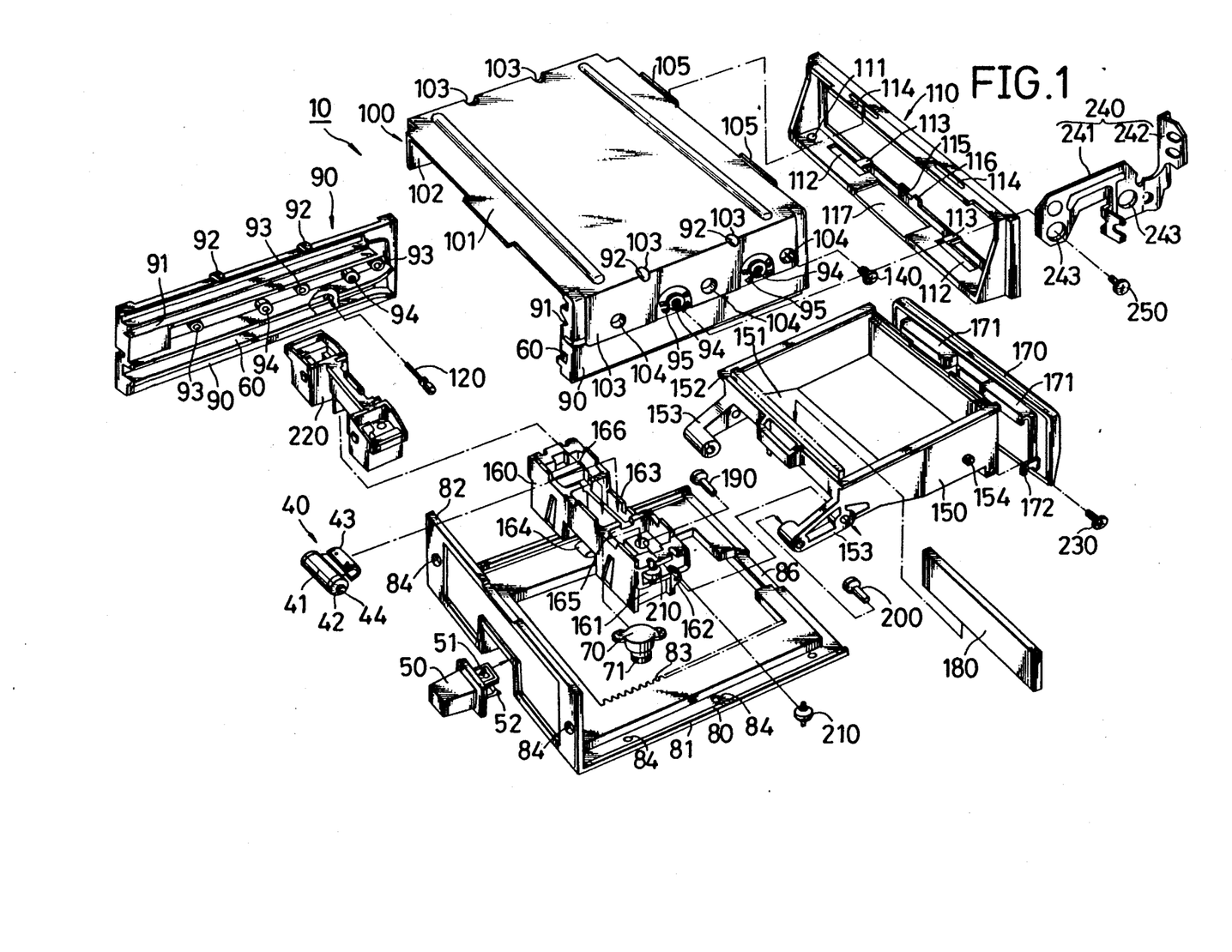
FIG. 1 is an exploded perspective view of an embodiment of a drawer apparatus according to the present invention.

As shown in FIG. 1, the housing 20 includes an under panel 80 having a bottom wall 81 and a rear wall 82, a pair of side panels 90 which form the left and right side walls, an outer casing 100 having an upper wall 101, a front frame 110 which forms the front edge portion of the opening of the housing 20. The individual components are separately formed of a plastic except for the outer casing 100.

Figure 5:
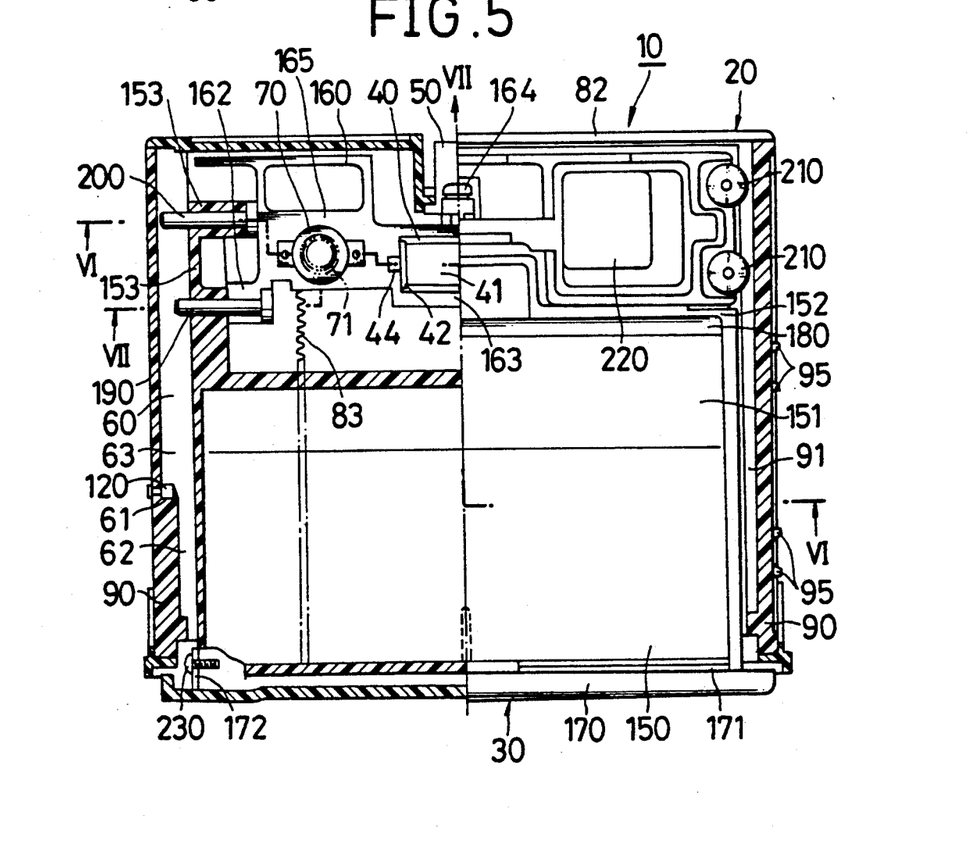
FIG. 5 is a horizontal cross-sectional view of the essential parts of the drawer apparatus of FIG. 1.
Figure 6:
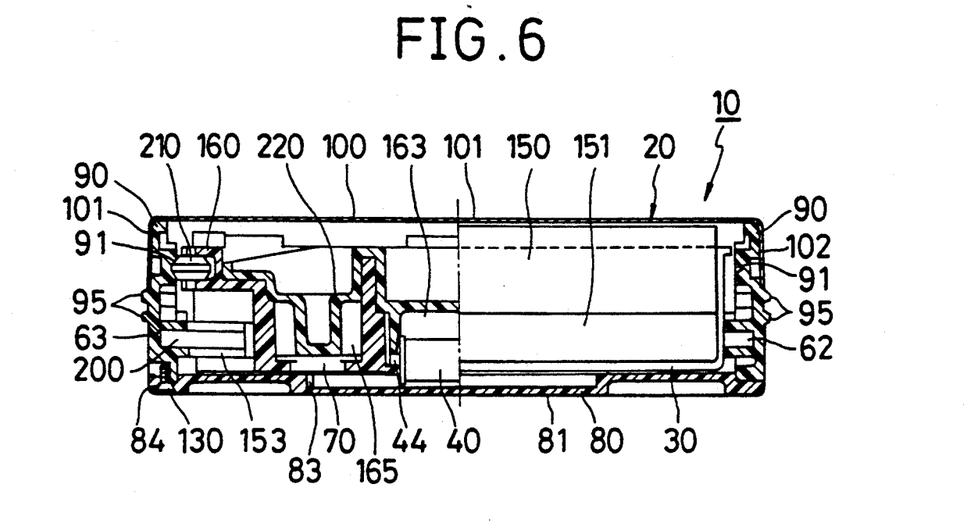
FIG. 6 is a section taken along the line VI—VI of FIG. 5.

As shown in FIGS. 1, 5 and 6, a rack 83 which is meshed with a pinion gear 71 of the rotary damper 70 is formed on the side of a londitudinal recess formed in the upper surface of the bottom wall 81 of the under panel 80.

Figure 10:
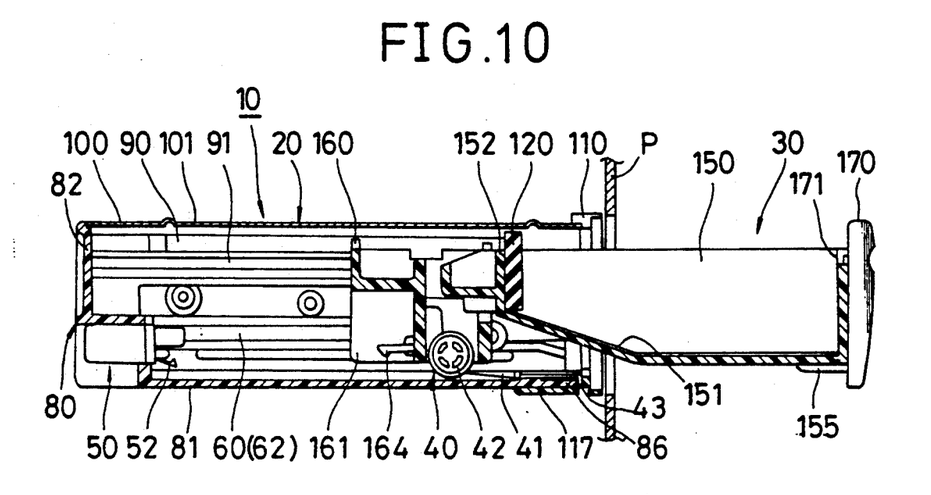
FIG. 10 is a vertical cross-sectional view showing the state in which a tray has been drawn out.

As shown in FIGS. 1, 5 and 10, the latch 50 is fixed substantially to the center of the rear wall 82 of the under panel 80 in such a manner that it protrudes into the hollow housing 20 from the rear side thereof.

Figure 7:
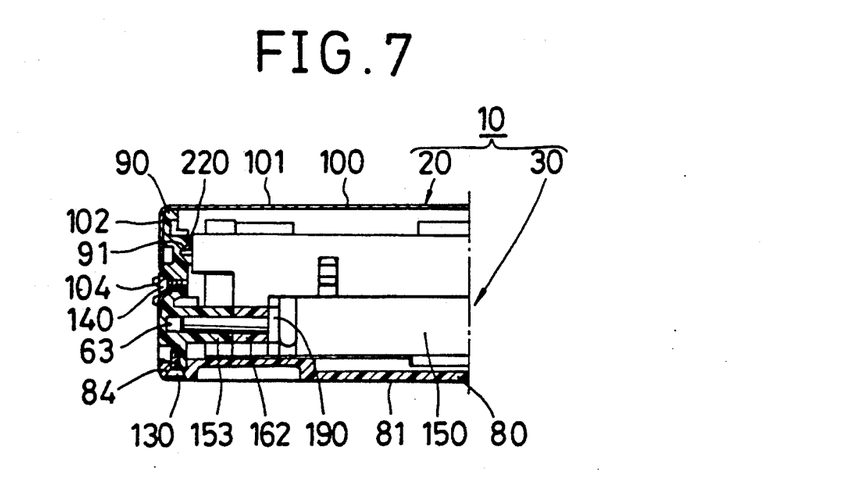
FIG. 7 is a section taken along the line VII—VII of FIG. 5.

The side panel 90 has on its inner surface the guide groove 60 having a U-shaped cross section and a roller groove 91 having a V-shaped cross-section above the guide groove 60, as shown in FIGS. 1, 5 and 7. The both grooves 60 and 91 are formed in the direction in which the tray 30 is caused to slide.

As shown in FIG. 5, the guide groove 60 has a locking shoulder portion 61 for making the guide groove 60 shallow halfway through the length of the guide groove 60. The locking shoulder portion 61 divides the guide groove 60 into a first shallow groove 62 located on the outer side of the side panel 90 and a second deep groove 63 located on the inner side thereof.

As shown in FIGS. 1 and 5, an elastic member 120 made of, for example, rubber, is provided in the second groove 63 at a position which faces the rear surface of the locking shoulder portion 61.

The pair of side panels 90 are fixed to the bottom and rear walls 81 and 82 of the under panel 80 using flat countersunk head screws 130 (see FIGS. 1, 6, 7).

The bottom and rear walls 81 and 82 of the under panel 80 have countersinks 84 which have the form of truncated cone and which are large enough to receive the flat heads of the screws 130 flatly.

The outer casing 100 has a U-shaped form whose open side is directed downward, as shown in FIG. 1. The outer casing 100 includes an upper wall 101 for closing the upper open surface of the housing 20, and a pair of side pieces 102 which hang from the two side edges of the upper wall 101 substantially at right angle with respect to the upper wall 101 along the outer surfaces of the pair of side panels 90.

Figure 8:
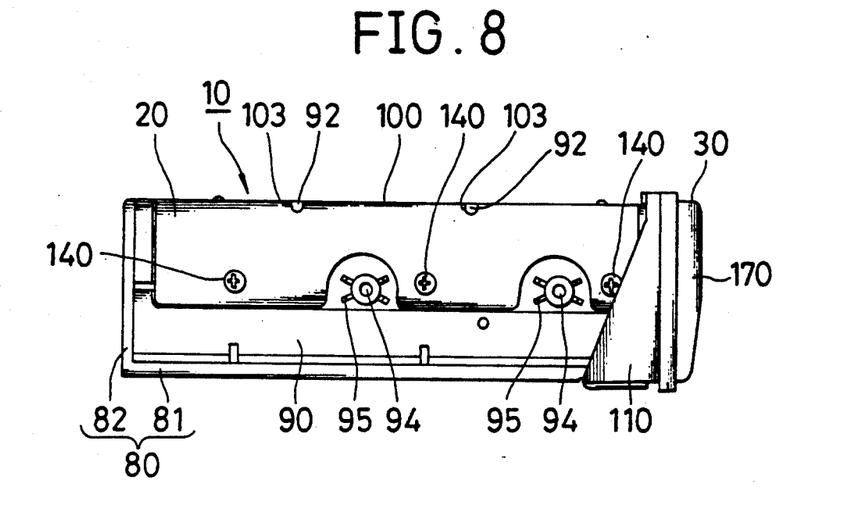
FIG. 8 is a view similar to FIG. 4 showing the drawer apparatus from a bracket is removed.

When the outer casing 100 is mounted, it is fitted on the under panel 80 from above with the pair of side pieces 102 thereof being guided along the outer surfaces of the side panels 90 fixed to the under panel 80, and then fixed to the side panels using flat countersunk head screws 140, as shown in FIGS. 5, 6 and 8.

Each of the side panels 90 has warhead-shaped positioning projections 92 on its upper edge, as shown in FIGS. 1, 7 and 8. The outer casing 100 has slits 103 formed on the corners between the upper wall 101 and the side pieces 102. The slits 103 receive the corresponding projections 92. This facilitates positioning of the outer casing 100 with respect to the side panels 90 and ensures reliable positioning, thus facilitating the tightening work of the screws 140.

As shown in FIGS. 1 and 7, the pair of side panels 90 have on the outer surface thereof conical grooves which are larger than the flat head of the screw 140. Each conical groove has a through-hole 93 which passes the side panel. The outer casing 100 has on its side pieces 102 conical countersinks 104 which face the corresponding grooves of the through-holes 93. The countersinks 104 are formed by blanking and accommodate the flat heads of the screws 140, as shown in FIGS. 1 and 7.

As shown in FIG. 1, the front frame 110 has a rectangular form when seen from the front side of the drawer apparatus. The front frame 110 is fitted to the open front edge portion of the housing 20 and fixed to the under panel 80 using flat countersunk head screws 130 for fixing the side panels 90 to the bottom wall 81 of the under panel 80. The screw 130 is screwed into the lower edge portion of the side panel 90 through the under surface of the front frame 110 and the bottom wall 81 of the under panel 80. The front frame 110 has conical countersinks 111 in the under surface thereof. The conical countersinks 111 are larger enough to accommodate the flat head of the screw 130.

Figure 11:
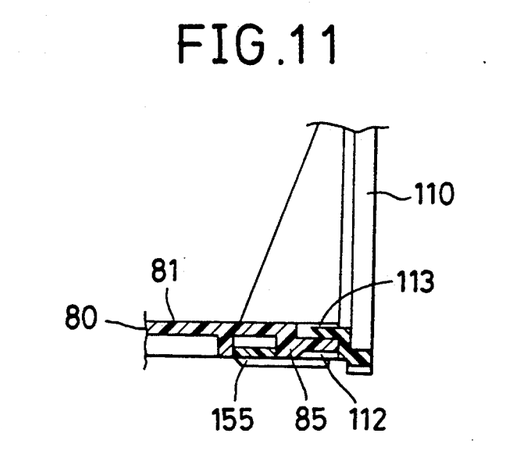
FIG. 11 a vertical cross-sectional view showing the mounting of a front frame on an under panel.

The under panel 80 has a pair of claw portions 85 having a saw-shaped cross section at the front edge portion of the bottom wall 81, as shown in FIG. 11. The front frame 110 has a pair of window portions 112 having substantially the rectangular shape for receiving the claw portions 85 of the under panel 80 in the lower edge portion thereof extending in the longitudinal direction, as shown in FIGS. 1 and 11. The front frame 110 also has a pair of pressing pieces 113 in the lower edge portion thereof above the window portions 112. The pressing pieces 113 extend from the lower edge portion of the front frame 110 in the rearward direction along the upper surface of the bottom wall 81 of the under panel 80.

As shown in FIG. 1, the outer casing 100 has a pair of inserting pieces 105 at the front edge portion thereof. The inserting pieces 105 extend in the upward direction from the front edge portion of the outer casing 100. The front frame 110 has a pair of receiver grooves 114 in the upper edge portion thereof. The receiver grooves 114 extend in the lateral direction and receive the corresponding inserting pieces 105 of the outer casing 100.

When the front frame 110 is mounted on the open front edge portion of the housing 20, the inserting pieces 105 of the outer casing 100 are inserted into the receiver grooves 114 of the front frame 110, and then the lower edge portion of the front frame 110 is fitted to the front edge portion of the bottom wall 81 of the under panel 80. At that time, the claw portions 85 of the under panel 80 are fitted into the corresponding window portions 112 of the front frame 110 due to the elasticity of the pressing pieces 113 of the front frame 110, as shown in FIG. 11.

The tray 30 will be described next. As shown in FIG. 1, the tray 30 has a box-shaped tray body 150 whose upper surface is open, a slider 160 pivotaly mounted on the rear portion of the tray body 150 and held thereto in such a manner as to be slidable in the hollow housing 20, and a front panel 170 mounted on the front surface of the tray body 150. The individual components are made of a plastic separately.

The tray body 150 has an inclined surface 151 at the bottom of the recess thereof, as shown in FIG. 1 and 10. The inclined portion 151 is inclined upwardly toward the rear of the tray body 150 so as to allow the articles housed in the tray body 150 (not shown) to be easily taken out.

The tray body 150 may also have a bottom which is made of an irregular elastic material, as sponge or rubber. In this way, when one end of the coin or like accommodated in the tray body 150 is pushed, the other end thereof floats up due to the elasticity of the recessed portion, allowing the driver to easily pick up coins or the like. This is particularly advantageous when the driver desires to take out coins quickly at the toll gate of the throughway or the like.

As shown in FIGS. 1 and 10, the tray body 150 has a stopper member 180 at the rear end of the recessed portion thereof. The stopper member 180 protrudes upward from an upper edge 152 of the rear portion of the tray body 150. The stopper member 180 has a plate-like shape. The height of the stopper member 180 is slightly larger than the depth of the recessed portion, and the lateral length thereof is substantially equal to the width of the recessed portion. The stopper member 180 may be made of an elastic foamed material. The rear surface of the stopper member 180 has an adhesive surface which is adhered to the rear surface of the recessed portion of the tray body 150.

In this embodiment, the stopper member 180 has been adhered to the rear portion of the tray body 150. However, a stopper member having a predetermined length may hang from the under surface of the upper wall 101 of the outer casing 100 toward and as far as the upper edge 152 of the rear portion of the tray body 150. Alternatively, short stopper members may be provided on the under surface of the upper wall 101 of the outer casing 100 and on the upper edge 152 of the rear portion of the tray body 150 in an opposed relation or in such a manner that they are not aligned in the longitudinal direction of the housing 20.

Any stopper member can be provided so long as it is capable of preventing a thin article, such as a receipt or a card, accommodated in the tray body 150 from dropping into the housing 20 over the upper edge 152 of the rear portion of the tray body 150.

The tray body 150 has a pair of connecting arms 153 for connecting the slider 160. The connecting arms 153 extend in the rearward direction from the two end portions of the rear surface of the tray body 150, as shown in FIGS. 1 and 5.

As shown in FIGS. 1, 5 to 7, the slider 160 has an upper half portion which is substantially as wide as the tray body 150, and a lower half portion which is narrower than the tray body 150. The lower half portion is made narrower than the upper half portion so as to allow a pair of spaces 161 for accommodating the pair of connecting arms 153 of the tray body 150 to be formed on the two sides of the lower half portion. The lower half portion of the slider 160 has at its two sides a pair of bearing pieces 162, as shown in FIG. 1, 5 and 7. The bearing pieces 162 extend in the forward direction along the inner surface of the proximal portion of the connecting arm 153.

As shown in FIGS. 1, 5 and 7, the tray body 150 and the slider 160 are coupled to each other by means of two metal pivot pins 190 which are passed through the bearing pieces 162 of the slider 160 and then the proximal portions of the connecting arms 153. The distal end portion of the pivot pin 190 protrudes from the outer surface of the connecting arm 153 of the tray body 150 into the corresponding guide groove 60 of the side panel 90 located on each side of the tray body 150, as shown in FIGS. 5 and 7. The protruding length of the pivot pin 190 is substantially the same as the depth of the shallow first groove 62 of the guide groove 60 of the side panel 90.

As shown in FIGS. 1, 5 and 6, two metal guide pins 200 are also passed through the rear end portions of the connecting arms 153 from the inner side thereof and then protruded into the corresponding guide grooves 60 of the side panel 90. The protruding length of the guide pin 200 is longer than that of the pivot pin 190 and substantially the same as the depth of the second groove 63 of the guide groove 60 of the side panel 90.

As the tray 30 is advanced, the protruding portion of the guide pin 200 moves along the second groove 63 of the guide groove 60, and then abuts against the elastic member 120 located immediately in advance of the rear surface of the locking shoulder portion 61, by means of which the maximum protruded position of the tray 30 is determined.

The front edge portion of the tray body 150 has a pair of shaft-shaped guide protrusions 154 on the two side surfaces thereof, as shown in FIG. 1. The guide protrusions 154 protrude shortly into the corresponding guide grooves 60 of the side panel located on the two sides of the tray body 150.

Figure 2:
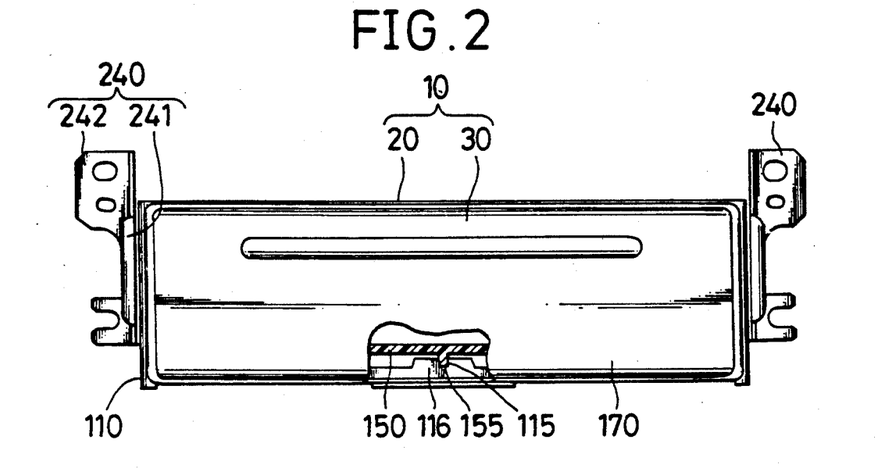
FIG. 2 is a front view of the drawer apparatus of FIG. 1.
Figure 3:
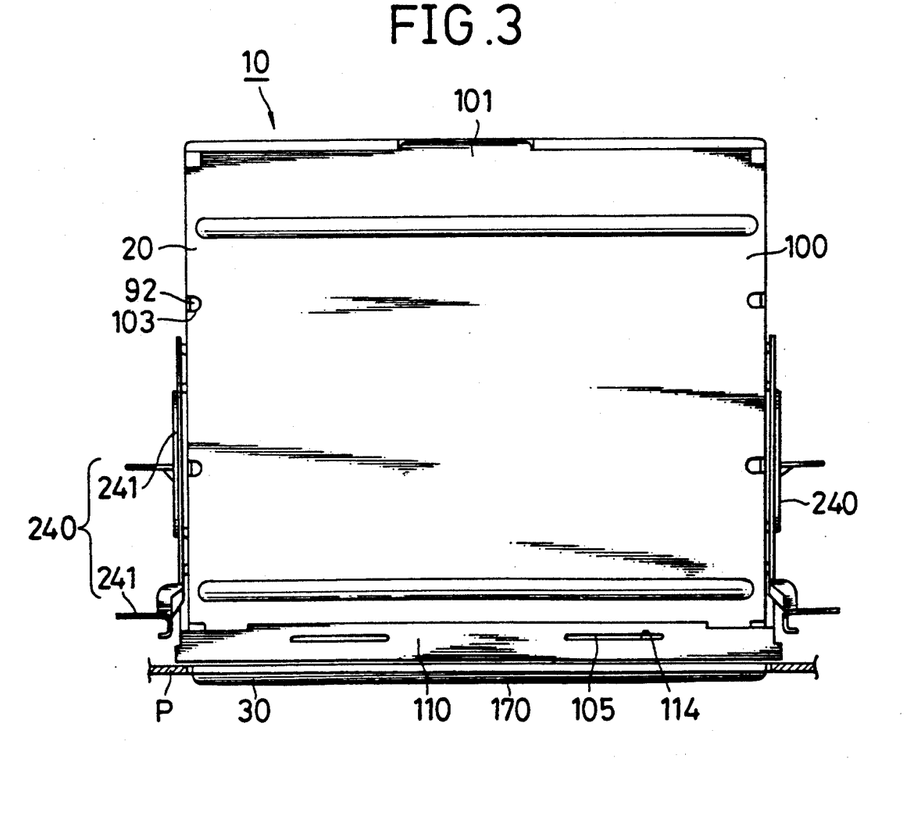
FIG. 3 is a plan view of the drawer apparatus of FIG. 1.

As shown in FIGS. 10 and 11, the front edge portion of the tray body 150 has guide rib 155 at the center of the under surface thereof. The guide rib 155 protrudes downwardly. The lower edge portion of the front frame 110 has a guide piece 116 having a U-shaped groove 115, as shown in FIGS. 1 and 2. The guide piece 116 receives the guide ribs 155 and thereby guides the tray body 150 to enter and come out from the hollow housing 20 parallel thereto.

As shown in FIGS. 1, 5 to 7, the upper half portion of the slider 160 has a pair of recesses on the two side surfaces thereof. The recesses are open to the side of the slider 160 and accommodate a pair of rollers 210. Each of the rollers 210 has a shape which resembles the bead on an abacus. A part of the outer periphery of the roller 210 protrudes into the corresponding V-shaped roller groove 91 of the side panel 90 located on each side of the slider 160.

The spring device 40 is mounted on the slider, as shown in FIGS. 1, 5 and 10. More specifically, the spring device 40 includes a belt-shaped constant-pressure spring 41 for urging the tray 30 in the direction such that it protrudes from the open front surface of the housing 20, a spool 42 around which the constant-pressure spring 41 for urging the tray 30 in the direction such that it protrudes from the open front surface of the housing 20, a spool 42 around which the constant-pressure spring 41 is wound with its one end portion fixed thereto, the two end portions of the spool 42 being rotatably locked to the slider 160, and a hook 43 fixed to the other end portion of the constant-pressure spring 41 and hooked to the open front edge portion 86 of the bottom wall 81 of the under panel 80.

The spool 42 has a pair of protruding shafts 44 at the center of the two side surfaces thereof, as shown in FIGS. 1 and 5 to 7.

The spring device 40 is mounted on the slider 160 in the manner described below. The upper half portion of the slider 160 has at its center a hollow box-shaped accommodating portion 163 for accommodating the spool 42, as shown in FIGS. 1, 5, 6 and 10. The upper and lower surfaces of the accommodating portion 163 are opened. The spool 42 is placed into the accommodating portion 163 from the open upper surface thereof. In the accommodating portion 163, the two protruding shafts 44 are supported by the edge of the bottom of the accommodating portion 163, and a part of the outer periphery of the spool 42 protrudes from the open under surface of the accommodating portion 163.

The constant-pressure spring 41 wound around the spool 42 is drawn out through the open under surface of the accommodating portion 163, and led in the forward direction along the bottom of the recess of the under panel 80 to the front edge portion of the bottom wall 81 of the under panel 80 where the hook 43 fixed to the distal end of the spring 41 is hooked to the locking edge 86 located at the center of the open front edge portion of the bottom wall 81 from above.

As shown in FIGS. 1 and 10, the locking edge 86 is recessed to the depth of the recess of the under panel 80 and in the rearward direction from the end surface of the open front edge portion of the bottom wall 81.

The front frame 110 has a retaining portion 117 at the center of the lower edge thereof, as shown in FIGS. 1 and 10. The retaining portion 117 is recessed in the shape of the hook 43 and faces the locking edge 86 of the under panel 80 with the hook 43 fixed to the distal end of the constant-pressure spring 41 therebetween.

Therefore, when the hook 43 of the constant-pressure spring 41 is hooked to the locking edge 86 of the under panel 80 and then the front frame 110 is mounted on the open front edge portion of the bottom wall 81 of the under panel 80, the hook 43 of the constant-pressure spring 41 is fitted into the retaining portion 117 of the front frame 110 and is thereby prevented from being released from the locking edge 86 of the under panel 80, as shown in FIG. 10.

A strike 164 protrudes from the slider 160 in the rearward direction, as shown in FIGS. 1, 5 and 10. The strike 164 is engaged with the latch 50 fixed to the center of the rear wall 82 of the under panel 80.

The latch 50 is fixed to the center of the rear wall 82 of the under panel 80 in such a manner that it protrudes into the hollow housing 20, as shown in FIGS. 1 and 10. More specifically, when the latch 50 is pushed in by the strike 164 of the slider 160, the latch 50 retracts with the strike 164 caught therein and is locked at that retracted position due to the action of a heart cam groove 51. When the latch 50 is pushed in again by the strike 164, it is unlocked due to the action of the heart cam groove 51 and advances by the recovering force of a spring (not shown). A catch 52 of the latch 50 releases the strike 164 at an advanced position. The inner structure of the latch 50 will not be discussed in detail, because the known techniques such as those disclosed in, for example, Japanese Patent Laid-Open Nos. 163870/1986 and 12578/1988, can be used for that.

The rotary damper 70 is mounted on the slider 160, as shown in FIGS. 1, 5 and 6. The rotary damper 70 is designed to brake the rotation of the rotary shaft (not shown) for mounting the pinion gear 71 meshed with the rack 83 of the under panel 80 due to the viscous resistance of a viscous fluid (not shown) sealed therein, such as grease. The inner structure of the rotary damper 70 will not be discussed here in detail, because the known techniques, such as those disclosed in, for example, Japanese Patent Laid-Open No.s 192937/1986 and 133134/1986, can be used.

The rotary damper 70 is mounted on the slider 160 in the manner described below. As shown in FIGS. 1, 5 and 6, the slider 160 has hollow box-shaped recessed portions 165 and 166 in the two sides thereof. The recessed portions 165 and 166 are opened at their upper surfaces. The rotary damper 70 is placed into the recessed portion 165 located on this side as viewed in FIG. 1 from its open upper surface. At that time, the pinion gear 71 is protruded downward from the bottom wall of the recessed portion 165 and meshed with the rack 83 of the under panel 80.

In FIG. 1, a reference numeral 220 denotes a piece having protruding portions, which are fitted into the accommodating portion 163 and the recessed portions 165 and 166 located at the two sides thereof when the piece 220 is mounted on the center of the slider 160. Fixing of the spring device 40 accommodated in the accommodated portion 163 and the rotary damper 70 in the recessed portion 165 is performed by mounting the piece 220 on the slider 160.

Figure 9:
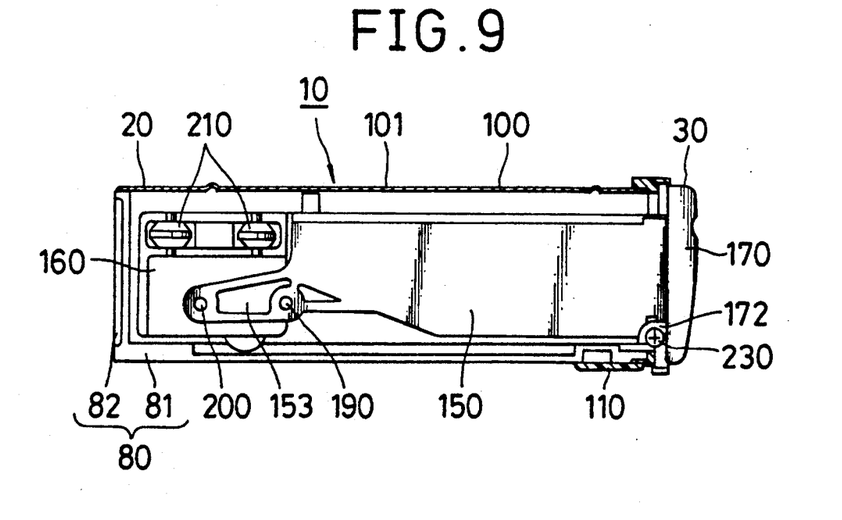
FIG. 9 is a vertical cross-sectional view of the essential parts of the drawer apparatus of FIG. 1.

The front panel 170 has a pair of hook portions 171 at the rear surface of the upper portion thereof, as shown in FIGS. 1, 9 and 10. The hook portions 171 extend in the rearward direction and are hooked to the upper edge of the front wall of the tray body 150. The front panel 170 also has a pair of locking pieces 172 each having a hook-like shape at one end of the rear surface of the lower portion thereof. The locking pieces 172 extend in the rearward direction from the rear surface of the front panel 170 along the two side walls of the tray body 150.

When the front panel 170 is mounted on the tray body 150, screws 230 are screwed into the outer surface of the lower end portions of the two side walls of the tray body 150 in a state wherein they are hooked in the locking piece 172 of the front panel 170 and then tightened into the side walls of the tray body 150, as shown in FIGS. 1, 9 and 10, to fix the locking pieces 172.

The front panel 170 is mounted on the tray body 150 after the coating of the front panel 170 has been completed. In this way, attachment of the coating to the tray body 150 can be prevented.

That is, the front of the tray 30 is colored in the same color as that of the surface of the instrument panel P so as to make the tray 30 and the instrument panel P look as one unit. However, since the drawer apparatus 10 is assembled separately from the instrument panel P, the drawer apparatus 10 is coated in the same color as that of the instrument panel P after it has been assembled. Therefore, masking is conventionally required so that coating may not attach to the portion of the tray 30 other than the front thereof during the coating, which is a troublesome task. Furthermore, even if masking is performed, the coating material may attach to the portion of the tray 30 other than the front thereof, deteriorating the appearance of the tray 30. Particularly, the coating material attached to the side surfaces or guide protrusions 154 of the tray body 150 may adversely affect the sliding function of the tray body 150.

However, in this embodiment, the tray body 150 and the front panel 170 are formed separately so as to allow the front panel 170 to be mounted on the tray body 150 thereafter. As a result, coating can be performed for the front panel 170 alone.

In this way, a plurality of front panels 170 is aligned and coated at the same time, increasing the efficiency of the coating. Furthermore, since there is no attachment of the coating material to the tray body 150, sliding function of the drawer apparatus 10 is not affected by the coating material, and reliability of the drawer apparatus 10 is thus improved.

The drawer apparatus 10 assembly is fixedly embedded in the instrument panel P using the pair of brackets 240 (see FIGS. 1 to 4).

As shown in FIGS. 1 to 4, the pair of brackets 240 are symmetrical in terms of their shape. Each of the brackets 240 has a side piece 241 fixed to the outer surface of the side panel 90 of the housing 20, and an extending piece 242 extending outward from the front edge portion of the side piece 241 and fixed to the instrument panel P. The bracket 240 may be formed of a metal plate.

Figure 4:
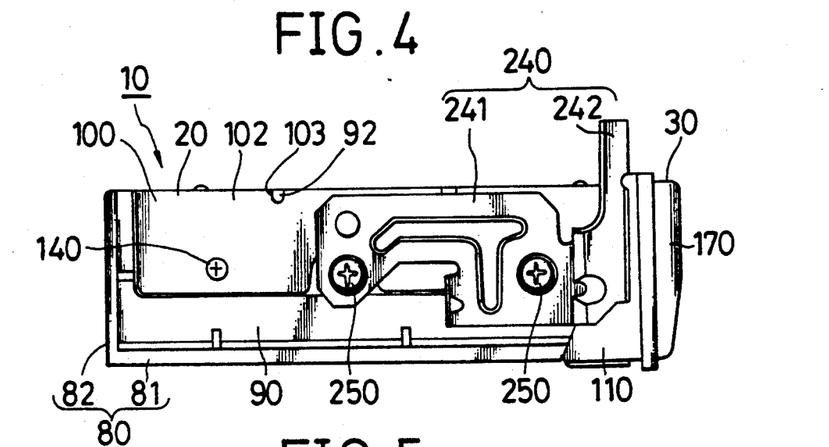
FIG. 4 is a side elevational view of the drawer apparatus of FIG. 1.

The side piece 241 of the bracket 240 is fixed to the outer surface of the side panel P using flat countersunk head screws 250, as shown in FIGS. 1 and 4.

To accomplish this, the side piece 241 of the bracket 240 has a pair of countersinks 243 which have the form of a truncated cone and which are large enough to receive the head portion of the screw 250, as shown in FIG. 1. These countersinks 243 are formed in such a manner that the diameter thereof decreases toward the side panel 90 by blanking.

As shown in FIGS. 1 and 8, the side panel 90 has a pair of mounting through-holes 94 into which the screws 250 are screwed. The side panel 90 also has on its outer surface of the protruding edges 95 which extend in a radial fashion from the center of each of the mounting holes 94. The inner peripheral edges of the protruding edges 95 are recessed such that they have substantially a cone-shaped form as a whole. When the countersinks 243 are positioned with respect to the mounting holes 94, they are easily registered with the holes 94 by hitting the countersinks 243 of the bracket 240 into the corresponding recesses.

The operation of the drawer apparatus 10 will now be described.

The tray 30 is locked at the position where it is accommodated in the housing 20 by means of the latch 50 against the contracting force of the constant-pressure spring 41, as shown in FIGS. 2 to 9.

To draw out the tray 30 locked at its locked position, the front surface of the front panel 170 is slightly pushed in.

This causes the tray body 150 and the slider 160 in combination to retract within the housing 20. At that time, the catch 52 of the latch 50 is pushed in by the strike 164 of the slider 160, unlocking the latch 50. As a result, the catch 52 slightly advances and releases the strike 164.

When the strike 164 is released from the catch 52, the tray body 150 and the slider 160 in combination advance within the housing 20 due to the contracting force of the constant-pressure spring 41.

At that time, the tray body 150 advances slowly and quietly due to the braking action provided by the mesh of the pinion gear 71 of the rotary damper 70 with the rack 83 of the bottom wall 81 of the housing 20.

As the tray 30 advances, the protruding end of the guide pin 200 which is passed through each of the connecting arms 153 of the tray body 150 advances along the deep second groove 63 of the guide groove 60 and then resiliently abuts against the elastic member 120 located immediately before the rear surface of the locking shoulder portion 61, by which the maximum protruding position of the tray 30 is restricted. At that time, the sound of collision of the guide pin 200 with the elastic member 120 is muffled because of the resilient collision of the guide pin 200 with the elastic material 120.

Thus, the tray body 150 protrudes in front of the instrument panel P, as shown in FIG. 10, and is prepared for use.

After the tray 30 has been used, the operator pushes in the front surface of the front panel 170.

When the front panel 170 is pushed in, the tray body 150 and the slider in combination retract within the housing 20, and the strike 164 of the slider 160 thereby engages with the catch 52 of the latch 50. At that time, the strike 164 slightly pushes in the catch 52 and is caught by the catch 52, by which the latch 50 is locked.

When the latch 50 is locked, the tray body 150 is locked at the accommodated position where it is accommodated in the housing 20 against the contracting force of the constant-pressure spring 41, as shown in FIG. 5.

In the above-described embodiment, the housing 20 is made up of the under panel 80, the pair of side panels 90, the outer casing 100, and the front frame 110. However, the under panel 80, the side panels 90 and the outer casing 100 may be formed as one unit.

Also, the tray body 150, the slider 160 and the front panel 170 may be formed as one unit.

Furthermore, although the above embodiment employs the latch 50 which utilizes the heart cam groove 51, the latch may be the type which utilizes a rotary cam.

The drawer apparatus 10 which is used as the glove compartment has been described. However, the drawer apparatus 10 may also be used as an slide-type ash tray. Alternatively, it may be applied to the furnitures, household electric appliances or office equipment.

What is claimed is:

1. A drawer apparatus comprising:
   a hollow housing having a front frame with at least one open front surface, an upper wall and a bottom wall with an open edge portion;
   a tray slidably retained in said hollow housing and having a tray body with a rear portion and a recessed portion for storage, said tray being entered or drawn out from said housing through the open front surface thereof;
   urging means for urging said tray in a direction in which said tray protrudes from the open front surface of said housing;
   locking means disposed inside said housing for locking said tray to a position where said tray is accommodated in said hollow housing against urging force of said urging means; and
   restriction means disposed inside said housing for restricting maximum protruding position of said tray,
   wherein said urging means includes a constant-pressure spring for providing a contracting force and for urging said tray to move in the direction in which said tray protrudes from the open front surface of said housing due to the contracting force of said urging means, a spool to which one end portion of said constant-pressure spring is fixed and around which said constant-pressure spring is wound, said spool being pivotally fixed to said tray, and a hook foxed to the other end portion of said constant-pressure spring, said hook being hooked to the open front edge portion of the bottom wall of said housing, said front frame having an opening through which said tray is entered or drawn out from said housing, said front frame having a retaining portion which faces the open front edge portion of said bottom wall of said housing with the hook provided on the other end portion of said constant-pressure spring.

2. A drawer apparatus according to claim 1, wherein said front frame comprises a rectangular frame.

3. A drawer apparatus according to claim 1, wherein said retaining portion comprises a recess which is formed at the central portion of the lower edge of said front frame so as to house the hook.

4. A drawer apparatus according to claim 1, further comprising at least one stopper member disposed on at least one of the rear potion of said tray and said upper wall of housing facing said rear portion of said tray.

5. A drawer apparatus according to claim 4, wherein a plurality of said stopper members is formed on both said rear portion of said tray body and said upper wall in opposed relation such that they do not align in the longitudinal direction of the housing.

6. A drawer apparatus according to claim 4, wherein a plurality of said stopper members is formed on both said rear portion of said tray body and said upper wall such that one of said stopper members protrudes from said upper wall toward said rear portion of said tray body and is located adjacent to and in opposed relation to said rear portion of said tray body.

7. A drawer apparatus according to claim 4, wherein said stopper member has a plate-like form whose height is larger than a depth of the recessed portion of the tray body and whose lateral length is substantially the same as a width of the recessed portion.

8. A drawer apparatus according to claim 4, wherein said stopper member is formed of an elastic material.

9. A drawer apparatus according to claim 4, wherein said stopper member is formed of an elastic foamed material.

* * * * *